United States Patent [19]

Petzow et al.

[11] Patent Number: 4,670,408

[45] Date of Patent: Jun. 2, 1987

[54] PROCESS FOR THE PREPARATION OF CARBIDE-BORIDE PRODUCTS

[75] Inventors: Günter Petzow, Leinfelden-Echterdingen; Heinrich Hofmann, Gerlingen, both of Fed. Rep. of Germany; Kurt Weiss, Vaduz, Liechtenstein

[73] Assignee: Max-Planck-Gesellschaft Zur Foerderung der Wissenschaften E.V., Munich, Fed. Rep. of Germany

[21] Appl. No.: 777,230

[22] Filed: Sep. 18, 1985

[30] Foreign Application Priority Data

Sep. 26, 1984 [DE] Fed. Rep. of Germany ....... 3435345

[51] Int. Cl.$^4$ .................. C04B 35/56; C04B 35/58
[52] U.S. Cl. ........................... 501/87; 501/96; 501/98; 423/297
[58] Field of Search ............... 501/93, 96, 98, 87; 423/297; 75/238

[56] References Cited

U.S. PATENT DOCUMENTS

| | | | |
|---|---|---|---|
| 3,041,142 | 6/1962 | Van Der Beck et al. | 423/297 O |
| 3,088,805 | 5/1963 | Cotter et al. | 423/297 O |
| 3,316,062 | 4/1967 | Criscione et al. | 423/297 O |
| 3,328,127 | 6/1967 | Byrns | 423/297 O |
| 3,749,571 | 7/1973 | Stibbs et al. | 501/96 X |
| 3,859,399 | 1/1975 | Bailey et al. | 501/93 X |
| 4,029,000 | 6/1977 | Nakamura | 501/87 X |
| 4,500,643 | 2/1985 | Gesing et al. | 501/96 O |
| 4,512,946 | 4/1985 | Brun et al. | 501/96 X |
| 4,539,141 | 9/1985 | Brun et al. | 501/96 X |
| 4,539,299 | 9/1985 | Brun et al. | 501/96 O |

FOREIGN PATENT DOCUMENTS

| | | | |
|---|---|---|---|
| 0582544 | 9/1959 | Canada | 423/297 |
| 0722557 | 11/1965 | Canada | 423/297 |
| 0812092 | 12/1955 | United Kingdom | 423/297 |

*Primary Examiner*—William R. Dixon, Jr.
*Assistant Examiner*—Karl Group
*Attorney, Agent, or Firm*—Toren, McGeady & Associates

[57] ABSTRACT

A process for the preparation of boron carbide/transition metal boride molded articles comprising hot pressing a mixture of from 25 to 75% by weight of boron carbide, from 15 to 40% by weight of boron, from 0 to 8% by weight of silicon, from 10 to 50% by weight of tungsten and/or titanium carbide, and from 0 to 6% by weight of cobalt.

9 Claims, No Drawings

PROCESS FOR THE PREPARATION OF CARBIDE-BORIDE PRODUCTS

BACKGROUND OF THE INVENTION

1. Field of the Invention

The invention relates to high hardness materials containing borides.

2. Description of the Prior Art

Mixtures, alloys, or ceramic materials, which contain carbides, such as, boron carbide, borides, such as, chromium boride, zirconium boride, titanium boride, molybdenum boride, tantalum boride, tungsten boride, and vanadium boride, optionally in addition to nitrides, are known. These materials have a very high hardness and can be used, for example, as sand blasting jets, for the treatment of abrasive disks, and for the preparation of objects which are subject to other, appreciable stresses. It is well known that alloys and mixtures based on boron carbide have very good material wear properties; yet, they are not satisfactory in respect to some material properties (Powder Metallurgy International, 1983, vol. 5, 201–205). This is true also for those boron carbide materials, which contain additional components, such as, borides and/or nitrides.

SUMMARY OF THE INVENTION

It is an object of the present invention to provide a process which makes accessible boron carbide materials with completely satisfactory properties, which can be used for purposes of high stress, especially as molded articles.

This is accomplished, in accordance with the present invention, by intimately contacting a finely particulate boron carbide with boron and a transition metal carbide and hot pressing the resulting powder to produce a molded article.

DESCRIPTION OF THE PREFERRED EMBODIMENT

The finely particulate or finely grained boron carbide used in the process generally has a particle size in the range of 0.5 to about 50 $\mu$m and, preferably, in the range of from 1 to 10 $\mu$m. While $B_4C$ is preferred, other boron carbides may be used in the process. It has also proven to be advantageous to use the boron in finely particulate form, and especially in an amorphous form.

The intimate contact, which is required inventively, is brought about by mixing. For this purpose, conventional mixing devices, such as, stirring devices, asymmetrically moved mixers, and the like can be used.

It has proven to be particularly advantageous to carry out the intimate mixing in the presence of silicon and/or cobalt, and especially in the presence of metallic silicon in finely divided form.

It is particularly advantageous to use a tungsten carbide and/or titanium carbide as the transition metal carbide. In implementing the process, WC and/or TiC are regularly preferred.

The mixing process can be aided significantly by attrition. In this case, the process is carried out with balls of a transition metal carbide and cobalt, such as, WC-Co or WC-TiC-Co. The cobalt, which acts above all as a process aid, can be introduced in this manner into the process in the form of an alloy with the transition metal carbides. The hard metal alloy balls generally have a diameter in the range of 0.5 to 5 mm and, preferably, in the range of about 1 to 2 mm. It has proven to be advantageous in this connection to work in the attritor with a tungsten carbide/cobalt or a tungsten carbide/titanium carbide/cobalt hard metal stirrer.

Organic solvents suitable for use in the attrition process include inert media, such as, saturated hydrocarbons, particularly, an aryl hydrocarbon benzene, as well as alcohols, such as, aliphatic $C_1$-$C_5$ alkenols and especially propanol.

Even though tungsten carbide and/or titanium carbide are much preferred for implementing the process, these carbides can be replaced, at least partially, by other transition metal carbides such as, zirconium carbide, chromium carbide, or tantalum carbide.

Although the sequence of the mixing operation does not appear to be critical, it has nevertheless proven to be successful to mix first of all the boron carbide powder with boron and silicon. The powder together with the transition metal carbide is then comminuted. Tungsten carbide and cobalt, or tungsten carbide, titanium carbide, and cobalt are preferred The process can optionally be carried out in the presence of an organic solvent.

It has proven to be particularly successful to conduct the comminuting-mixing process to a boron-carbide particle size of less than 1 $\mu$m. Moreover, mixtures can be prepared which contain boron carbide particles of 0.1–0.5 $\mu$m or even smaller particles as an essential component.

For implementing the process, mixtures of
25–75 weight percent boron carbide
15–40 weight percent boron
0–8 weight percent silicon
10–50 weight percent tungsten and/or titanium carbide
0–6 weight percent cobalt
are preferred. Moreover, the amount of boron should be such that it suffices at least for converting the introduced transitional metal carbide into the corresponding boride and, preferably, also for binding the carbide carbon set free.

If the product obtained is to be converted into molded articles by pressing the powder at an elevated temperature, that is, by conventional powder metallurgical means, the hot pressing is carried out in a vacuum or in an inert gas atmosphere, especially a noble gas atmosphere. A cold, isostatic preconsolidification of the intimate mixture can precede such a hot pressing operation. The hot pressing operation itself is generally accomplished at temperatures between 1550° and 1850° C.

The inventive molded articles are composed of alloys containing boron carbide/tungsten boride and/or titanium boride, obtained by one of the preceding processes. In particular, these include molded articles produced by the powder metallurgical method, especially cutting tools, such as, cutting-alloy tips and the like, which are characterized by a content of
66–85 volume percent of boron carbide and
34–15 volume percent of transition metal boride.

The preferred transition metal boride is tungsten boride or tungsten boride and titanium boride. The volume ratio of tungsten boride to titanium boride preferably is 3:1 to 2:1. Molded articles, containing 72 volume percent of boron carbide and 28 volume percent of transition metal boride, and especially the aforementioned transition metal boride, have proven to be particularly successful.

Materials of the inventive type are frequently also referred to as ceramic materials or hard metal alloys. The inventively produced molded articles can be used especially as materials for the construction of wearing parts, especially cutting tools, and particularly those for cutting rock or for metal working processes, as well as for armor-plating and the like. In the inventively produced products, the carbidic phase is regularly present as B$_4$C, while the boridic phase, when tungsten carbide and titanium carbide are used, is regularly present as W$_2$B$_5$ or TiB$_2$.

EXAMPLE

57% by weight boron carbide powder (1-7 μm), 35.5% by weight amorphous boron (95%), and 7.5% by weight finely particulate silicon are mixed for one hour in an asymmetrically moved mixer. 40g of this mixture is pulverized in propanol in an attritor with 3kg of hard metal balls (tungsten carbide/cobalt or tungsten-/titanium carbide/cobalt) and a hard metal stirrer (1,000 rpm). The pulverizing time is 4 hours at the most. The attritioned powder is then separated from the propanol in a rotary evaporator and dried.

The powder is now ground in a WC-Co ball mill and screened to remove the coarse agglomerate, which has not disintegrated during the grinding process (mesh size of the screen: 0.15 mm). Tablets are produced in a press with an uniaxial bottom die and can be post-consolidated isostatically in the cold, for example at 635 MPa. The hot pressing is carried out under vacuum. The bottom die consists of graphite, which is coated with boron nitride in order to prevent a reaction between the powder and the graphite. It is subjected to a load of 25 MPa, heated to 1,000° C. and kept for 45 minutes at this temperature. The pressure is subsequently increased to 35 MPa and the temperature raised at the rate of 45° K/min to 1,800° C. and held at this temperature for 3 minutes. Subsequently, the temperature is lowered within 5 minutes to below 1,000° C., the pressure being reduced to 10 MPa.

What is claimed is:

1. A process for the preparation of molded articles based on boron carbide/transition metal boride selected from the group consisting of tungsten boride, titanium boride, or mixtures thereof comprising intimately mixing in finely particulate form, the following composition:

25-75 weight percent boron carbide
   14-40, weight percent boron
   10-50 weight percent tungsten and/or titanium carbide
   0-6 weight percent cobalt, and
   0-8 weight percent silicon, and hot pressing the powder obtained at temperatures between 1550° C. and 1850° C. to convert the carbide into the corresponding boride to produce molded articles.

2. The process of claim 1 wherein the boron is in amorphous form.

3. A process of claim 1 wherein the transition metal carbide and cobalt are used in the form of hard metal alloy balls.

4. The process of claim 3 wherein the balls have a diameter of from 0.5 to 2.5 mm.

5. The process of claim 1 wherein the boron carbide powder is first mixed with boron and silicon and the resulting powder is comminuted together with tungsten carbide and cobalt, or tungsten carbide, titanium carbide, and cobalt.

6. The process of claim 5 wherein the comminuting is carried out in a solvent.

7. The process of claim 5 wherein the tungsten or titanium carbide is replaced at least partially by other transition metal carbides.

8. The process of claim 7 wherein the other carbide is selected from the group consisting of zirconium carbide, chromium carbide, and tantalum carbide.

9. The process of claim 5 wherein the comminution is carried out to a particle size of less than 1 μm.

* * * * *